United States Patent Office

3,264,375
Patented August 2, 1966

---

3,264,375
PROCESS FOR THE GRAFT POLYMERIZATION OF STYRENE ON ALKYL LITHIUM CATALYZED POLYBUTADIENE USING A PEROXIDE CATALYST
Robert W. Jones, Wilbraham, Mass., assignor to Monsanto Company, St. Louis, Mo., a corporation of Delaware
No Drawing. Filed Jan. 16, 1963, Ser. No. 251,762
17 Claims. (Cl. 260—880)

This invention relates to rubber-modified styrene-type polymers and more particularly relates to novel processes for preparing such materials and for producing rubber-in-monomer solutions to be employed in preparing such materials.

It is known to prepare styrene-type polymers having improved impact strength by preparing a diene rubber, dissolving the diene rubber in a styrene-type monomer or in a monomer mixture including a styrene-type monomer, and subsequently polymerizing the monomer or monomers. Known processes for preparing rubber-modified styrene-type polymers by this technique have certain disadvantages, e.g., (1) in order for the diene rubber to be obtained in a form suitable for its being dissolved in a styrene-type monomer, it usually has to be separated from a reaction medium in which it has been synthesized and then shipped and stored as a solid prior to being dissolved in the styrene-type monomer, (2) shipping, storage, and handling costs for solids are usually higher than for liquids, (3) many diene rubbers are not readily dissolved in styrene-type monomers, (4) many rubber polymerization processes result in the formation of a diene rubber having an undesirably high content of 1,2- or 3,4-addition products, and (5) at least some diene rubbers become less suitable for use in preparing rubber-modified styrene-type polymers when they are stored for a time prior to use.

An object of the invention is to provide a novel process for preparing rubber-modified styrene-type polymers.

Another object is to provide a convenient, economical process for preparing rubber-modified styrene-type polymers.

A further object is to provide a novel process for preparing rubber-in-monomer solutions to be employed in producing rubber-modified styrene-type polymers.

These and other objects are attained by (1) preparing a rubber-in-monomer solution by contacting a conjugated 1,3-diene hydrocarbon with a lithium catalyst of the group consisting of lithium and a hydrocarbyl lithium in the presence of a diluent having a boiling point lower than 130° C. and selected from the group consisting of a conjugated 1,3-diene hydrocarbon, an alkane, a cycloalkane, an aromatic hydrocarbon, and mixtures thereof, maintaining the conjugated 1,3-diene hydrocarbon in contact with the lithium catalyst at least until a rubbery polymer is formed, adding at least 3 parts by weight of a monovinylidene aromatic hydrocarbon/part of rubbery polymer, and stripping the reaction mixture of ingredients having lower boiling points than the monovinylidene aromatic hydrocarbon by distillation; the reaction mixture being deactivated prior to the distillation step at a stage after a rubbery polymer has been formed and before sufficient monovinylidene aromatic hydrocarbon has block copolymerized with the rubbery polymer to form a polymer containing more than 75% by weight of combined monovinylidene aromatic hydrocarbon and (2) heating the rubber-in-monomer solution, optionally in intimate admixture with one or more copolymerizable materials, to polymerize the monovinylidene aromatic hydrocarbon and any other copolymerizable materials which have been incorporated.

The following examples are given to illustrates the invention and are not intended as a limitation thereof. The substantial absence of anionic catalyst poisons, such as air, oxygen, carbon dioxide, and Lewis acids, in the diene rubber syntheses described in the examples is insured by the techniques conventionally employed in anionic polymerization processes, i.e., pre-purification of the materials to be employed in the reaction, choice of a suitable reaction vessel, and maintenance of an inert atmosphere throughout the reaction. Unless otherwise specified, quantities mentioned are quantities by weight.

EXAMPLE I

*Part A*

Charge 10 parts of butadiene, 40 parts of cyclohexane, and about 0.02 part of a 15% solution of n-butyl lithium in hexane to a suitable reaction vessel. Heat the reaction mixture at 40° C. until the butadiene is substantially completely converted to polymer. Add about 0.006 part of butanol to deactivate the polymer, and then add 0.3 part of an alkaryl phosphite and 90 parts of styrene containing 0.0009 part of t-butyl catechol. Remove low-boiling materials, i.e., any unreacted butadiene, cyclohexane, and hexane, from the reaction mixture by fractional distillation under vacuum. The product is a solution in styrene of a rubbery polybutadiene consisting principally of 1,4,-butadiene units.

*Part B*

Dissolve 0.05 part of di-t-butyl peroxide and 0.1 part of a commercial dodecyl mercaptan modifier in the rubber-in-styrene solution of Part A. Purge the reaction vessel with nitrogen, and heat the reaction mixture at 110° C. with agitation until its solution viscosity stops increasing continuously with increased polymer formation, suddenly decreases, and then begins to increase again, indicating that phase inversion of the polymeric portion of the reaction mixture from a dispersion of polystyrene in rubber to a dispersion of rubber in polystyrene has occurred. Then transfer the reaction mixture to a reaction vessel containing (a) 100 parts of water, (b) 0.05 part of calcium chloride, (c) 0.13 part of an acrylic acid/2-ethylhexyl acrylate copolymer having a combined 2-ethylhexyl acrylate content of 4.5 mol percent and a specific viscosity of about 4.0 (as determined in a 1% aqueous solution at 25° C.) and (d) 0.2 part of the sodium salt of bis(sulfonaphthyl) methane. Pressurize the reaction mixture with nitrogen, and heat with agitation at 130° C. for 3 hours and 140° C. for 5 hours. The process results in substantially complete conversion of styrene to polymer, some of which is grafted onto the rubbery polymer. The product is a rubber-modified polystyrene having a higher impact strength than polystyrene.

Similar results are observed when Example I is repeated except that (1) about 0.0008 part of a 35% dispersion of finely-divided lithium in petrolatum, (2) about 0.06 part of a 10% solution of 2-ethylhexyl lithium in hexane, (3) about 0.01 part of a 15% solution of ethyl lithium in heptane, (4) about 0.04 part of a 10% solution of benzyl lithium in benzene, or (5) about 0.006 part of a 15% solution of ethylene dilithium in hexane is substituted for the 0.02 part of a 15% solution of n-butyl lithium in hexane.

EXAMPLE II

Repeat Example I except for substituting 90 parts of a 2:1 mixture of styrene and alpha-methylstyrene for the 90 parts of styrene. Similar results are observed except that the product has a higher heat distortion temperature than the rubber-modified polystyrene of Example I.

EXAMPLE III

Part A

Charge 100 parts of butadiene and about 0.02 part of a 15% solution of n-butyl lithium in hexane to a suitable reaction vessel. Heat the reaction mixture at 40° C. until 10% of the butadiene has been converted to polymer. Add about 0.006 part of butanol to deactivate the polymer, and then add 90 parts of styrene containing 0.0009 part of t-butyl catechol. Remove the unreacted butadiene from the reaction mixture by fractional distillation under vacuum. The product is a solution in styrene of a rubbery polybutadiene consisting principally of 1,4-butadiene units.

Part B

Polymerize the styrene of the rubber-in-styrene solution of Part A by the procedure described in Part B of Example I. The product is a rubber-modified polystyrene having a higher impact strength than polystyrene.

EXAMPLE IV

Part A

Charge 10 parts of butadiene, 50 parts of cyclohexane, and about 0.04 part of a 15% solution of n-butyl lithium in hexane to a suitable reaction vessel. Heat the reaction mixture at 50° C. until the butadiene is substantially completely converted to polymer. Add 60 parts of styrene to the reaction mixture, and—after 10 parts of styrene have polymerized—add about 0.02 part of butanol to deactivate the polymer. Remove low-boiling materials, i.e., cyclohexane and hexane, from the reaction mixture by fractional distillation under vacuum. The product is a solution in styrene of a rubbery polybutadiene/polystyrene block copolymer in which the polybutadiene block consists principally of 1,4-butadiene units.

Part B

Add 40 parts of alpha-methylstyrene, 0.05 part of di-t-butyl peroxide, 0.3 part of an antioxidant, and 0.1 part of a commercial dodecyl mercaptan modifier with agitation to the rubber-in-styrene solution of Part A. Purge the reaction vessel with nitrogen, and heat the reaction mixture with agitation at 100° C. until the stage of about 85% conversion of the styrene and alpha-methylstyrene monomers to polymer. Terminate the polymerization and devolatilize the product. The product is a rubber-modified styrene/alpha-methylstyrene copolymer having some of the styrene/alpha-methylstyrene copolymer grafted onto the rubbery polymer.

EXAMPLE V

Part A

Charge 5 parts of butadiene, 20 parts of cyclohexane, and about 0.004 part of a 15% solution of n-butyl lithium in hexane to a suitable reaction vessel. Heat the reaction mixture at 60° C. until the butadiene is substantially completely converted to polymer. Add about 0.002 part of butanol to deactivate the polymer, and then add 25 parts of styrene. Remove low-boiling materials, i.e., any unreacted butadiene, cyclohexane, and hexane, from the reaction mixture by fractional distillation under vacuum. The product is a solution in styrene of a rubbery polybutadiene consisting principally of 1,4-butadiene units.

Part B

Intimately mix 5 parts of a commercial linear polybutadiene rubber with the rubber-in-styrene solution of Part A. Then add 20 parts of styrene, 15 parts of acrylonitrile, 0.05 part of di-t-butyl peroxide, 0.3 part of an antioxidant, and 0.1 part of a commercial dodecyl mercaptan modifier with agitation. Purge the reaction vessel with nitrogen, and heat the reaction mixture at 110° C. until phase inversion has occurred. Transfer the reaction mixture to a reaction vessel containing (a) 100 parts of water, (b) 0.05 part of calcium chloride, (c) 0.13 part of an acrylic acid/2-ethylhexyl acrylate copolymer having a combined 2-ethylhexyl acrylate content of 4.5 mol percent and a specific viscosity of about 4.0 (as determined in a 1% aqueous solution at 25° C.) and (d) 0.2 part of the sodium salt of bis(sulfonaphthyl) methane. Pressurize the reaction mixture with nitrogen, and heat with agitation at 130° C. for 3 hours and 140° C. for 5 hours. The process results in substantially complete conversion of styrene and acrylonitrile to a copolymer, some of which is grafted onto the rubbery polymers. The product is a rubber-modified styrene/acrylonitrile copolymer having a higher impact strength than a styrene/acrylonitrile copolymer.

Similar results are observed when Example V is repeated except for substituting 5 parts of isoprene for the 5 parts of butadiene in the initial reaction vessel charge. The rubbery polyisoprene, like the rubbery polybutadiene of Example V, consists principally of 1,4-diene units.

In accordance with the present invention, a rubber-in-monomer solution suitable for the preparation of rubber-modified styrene-type polymers is conveniently produced by contacting a conjugated 1,3-diene hydrocarbon with a lithium catalyst of the group consisting of lithium and a hydrocarbyl lithium in the presence of a diluent having a boiling point lower than 130° C. and selected from the group consisting of a conjugated 1,3-diene hydrocarbon, an alkane, a cycloalkane, an aromatic hydrocarbon, and mixtures thereof, maintaining the conjugated 1,3-diene hydrocarbon in contact with the lithium catalyst at least until a rubbery polymer is formed, adding at least 3 parts by weight of a monovinylidene aromatic hydrocarbon/part of rubbery polymer, and stripping the reaction mixture of ingredients having lower boiling points than the monovinylidene aromatic hydrocarbon by distillation; the reaction mixture being deactivated prior to the distillation step at a stage after a rubbery polymer has been formed and before sufficient monovinylidene aromatic hydrocarbon has block copolymerized with the rubbery polymer to form a polymer containing more than 75% by weight of combined monovinylidene aromatic hydrocarbon. A rubber-modified styrene-type polymer is prepared by heating this rubber-in monomer solution, optionally in intimate admixture with one or more copolymerizable materials, to polymerize the monovinylidene aromatic hydrocarbon and any other copolymerizable materials which have been incorporated.

The conjugated 1,3-diene hydrocarbon which is polymerized in contact with the lithium catalyst is preferably butadiene, although other such diene hydrocarbons, e.g., isoprene, piperylene, etc., are also utilizable. Mixtures of conjugated 1,3-diene hydrocarbons can be employed if desired.

The lithium catalyst can be lithium or a hydrocarbyl lithium, preferably an alkyl, alkenyl, aryl, cycloalkyl, aralkyl, alkaryl, alkylcycloalkyl, or cycloalkylalkyl lithium wherein the hydrocarbyl radical contains 1–10 carbon atoms. The alkyl lithiums are especially preferred. Exemplary of utilizable hydrocarbyl lithiums are the methyl, ethyl, isopropyl, butyl, pentyl, hexyl, 2-ethylhexyl, allyl, methallyl, phenyl, benzyl, tolyl, 4-butylphenyl, 4-phenylbutyl, cyclohexyl, 4-butylcyclohexyl, and 4-cyclo-hexylbutyl lithiums, and the like, hydrocarbyl polylithiums, such as ethylene dilithium, pentamethylene dilithium, decamethylene dilithium, 1,3,5-trilithium propane, etc. The lithium or hydrocarbyl lithium, of course, is employed in a catalytic amount, the exact amount depending on the molecular weight desired for the rubbery polymer: higher catalyst concentrations lead to the formation of lower molecular weight rubbers. Ordinarily, from $1 \times 10^{-6}$ to $3 \times 10^{-5}$ mol of lithium catalyst is employed/gram of conjugated 1,3-diene hydrocarbon to be polymerized. Intimate contact between the catalyst and the conjugated 1,3-diene hydrocarbon is facilitated by employing the lithium catalyst in the form of a fine dispersion or solution in a suitable non-polar medium, such as an alkane, aromatic hydrocarbon, petrolatum, etc. Any medium in which the lithium catalyst is dispersed or dissolved must be non-polar, because the presence of polar materials during the polymerization of the conjugated 1,3-diene hydrocarbon favors a 1,2- or 3,4-addition of the diene units.

The diluent is a compound which has a boiling point lower than 130° C. and which is selected from the group consisting of a conjugated 1,3-diene hydrocarbon, an alkane, a cycloalkane, an aromatic hydrocarbon, and mixtures thereof. When a conjugated 1,3-diene hydrocarbon is employed as the diluent, it constitutes an excess of the conjugated 1,3-diene hydrocarbon which is to be polymerized, i.e., only a minor amount of the total conjugated 1,3-diene hydrocarbon serves as a monomer and the remainder serves as a diluent. When an alkane, cycloalkane, or aromatic hydrocarbon is employed as a diluent, it is usually preferred to use a compound which has a boiling point in the range of about 30–130° C., e.g., pentane, the hexanes, the heptanes, the octanes, cyclopentane, cyclohexane, cycloheptane, benzene, and the toluenes. Diluents having lower boiling points can be used when the reaction is to be conducted under sufficient pressure to maintain such diluents in the liquid phase. The minimum amount of diluent which should be used depends on the molecular weight of the rubbery polymer which is being prepared, larger amounts being necessary when the rubbery polymer has a higher molecular weight. The maximum amount of diluent to be used is set by economic rather than operability considerations. Ordinarily, at least 3 parts by weight of diluent are employed per part of conjugated 1,3-diene hydrocarbon to be polymerized.

Polymerization of the conjugated 1,3-diene hydrocarbon in contact with the lithium catalyst and in the presence of a diluent is usually accomplished at 0–100° C., preferably at about 40–70° C. Autogenous or applied pressure can be used to maintain ingredients of the reaction mixture in the liquid phase. If desired, minor amounts (e.g., up to about 5% of the weight of the total reaction mixture) of non-polar materials, such as white mineral oil lubricants, can be present during the polymerization, but polar materials, such as ester lubricants, cannot be employed since their presence would favor a 1,2- or 3,4-addition of the diene units. As is customary in anionic polymerization processes, anionic catalyst poisons, such as air, oxygen, carbon dioxide, and Lewis acids, should be substantially completely excluded. Compensation can be made for the presence of catalyst poisons by using a sufficient excess of lithium catalyst, but this is less economical than taking precautions to insure the substantial absence of the catalyst poisons.

Polymerization of the conjugated 1,3-diene hydrocarbon is continued until a rubbery polymer having the desired molecular weight is formed, and a monovinylidene aromatic hydrocarbon is then added to the reaction mixture either before or after deactivation of the rubbery polymer. Monovinylidene aromatic hydrocarbons utilizable in the preparation of the rubber-in-monomer solutions include, e.g., styrene; ar-alkylstyrenes, such as o-, m-, and p-methylstyrenes, ar-ethylstyrenes, p-butylstyrene, 2,4-diethylstyrene, etc.; alpha-alkylstyrenes, such as alpha-methylstyrene, alpha-ethylstyrene, alpha-methyl-p-methyl-styrene, etc.; and mixtures thereof. Preferred monovinylidene aromatic hydrocarbons are styrene, styrene/alpha-methylstyrene mixtures, and—when a copolymerizable monovinyl aromatic monomer is to be added after the removal of low boilers by distillation—alpha-methylstyrene. When a rubber-modified styrene-type polymer having good impact strength is desired, a non-vinyl monovinylidene aromatic hydrocarbon is not employed as the sole monovinylidene aromatic hydrocarbon added to the reaction mixture before the removal of low boilers or employed in concentrations higher than about 60 mol percent of the total amount of the monovinylidene aromatic hydrocarbon unless a copolymerizable monovinyl aromatic monomer is to be added after the removal of low boilers, since these non-vinyl monomers do not polymerize to sufficiently high molecular weight materials to permit good impact strength to be attained.

As noted above, the amount of monovinylidene aromatic hydrocarbon added to the reaction mixture before the removal of low boilers should be at least 3 parts by weight/part of rubbery polymer of the conjugated 1,3-diene hydrocarbon. Since, as demonstrated in Example V, a supplemental rubber can be intimately mixed with the rubber-in-monomer solution after the removal of low boilers, there naturally is no upper limitation on the amount of monovinylidene aromatic hydrocarbon which can be added. When no copolymerizable material, i.e., no supplemental rubbery polymer, additional monovinylidene aromatic hydrocarbon, or other copolymerizable material, is to be added to the rubber-in-monomer solution after the removal of low boilers, the amount of monovinylidene aromatic hydrocarbon added to the reaction mixture prior to the removal of low boilers is usually in the range of about 3–100 parts, preferably about 5–25 parts/part of rubbery polymer in order for the final rubber-modified styrene-type polymer product to have a polymerized conjugated 1,3-diene content of about 1–25%, preferably about 4–15%.

When the monovinylidene aromatic hydrocarbon is added before deactivation of the reaction mixture, it block copolymerizes with the rubbery polymer of the conjugated 1,3-diene hydrocarbon until the reaction mixture is deactivated. Since the block copolymers can tolerate higher monovinylidene aromatic hydrocarbon contents than conventional conjugated diene/monovinylidene aromatic hydrocarbon copolymers without losing their rubbery characteristics, block copolymerization can be allowed to continue until the rubbery polymer contains up to 75% by weight, e.g., about 5–75%, of combined monovinylidene aromatic hydrocarbon.

The reaction mixture is deactivated prior to the removal of low boilers at any desired stage between the formation of a rubbery polymer of a conjugated 1,3-diene hydrocarbon and the formation of a rubbery conjugated 1,3-diene hydrocarbon/monovinylidene aromatic hydrocarbon block copolymer containing about 75% by weight of combined monovinylidene aromatic hydrocarbon. Deactivation is accomplished in the conventional manner, i.e., by adding to the reaction mixture at least one equivalent, usually about 2–5 equivalents, of an anionic catalyst poison/equivalent of lithium catalyst employed. Any of the known catalyst poisons can be employed as deactivators in the practice of the invention, the preferred deactivators being water and alcohols such as methanol, ethanol, butanol, etc. The deactivator should be employed in amounts not substantially in excess of the amount required to deactivate the reaction mixture in order to avoid precipitating the rubbery polymer.

The reaction mixture is stripped of ingredients having lower boiling points than the monovinylidene aromatic hydrocarbon by distillation. Preferably, the reaction mixture is stripped by fractional distillation under vacuum, and any monovinylidene aromatic hydrocarbon which is distilled is recycled to the reaction mixture. When a conjugated 1,3-diene hydrocarbon has been employed as the diluent, it is sometimes desirable to remove only part of the diluent and leave the remainder in the reaction mixture for subsequent copolymerization with the monovinylidene aromatic hydrocarbon. Stripping of the reaction mixture is ordinarily accomplished in the presence of a polymerization inhibitor such as t-butyl catechol in order to prevent premature polymerization of the monovinylidene aromatic hydrocarbon, and a stabilizer such as an antioxidant can also be incorporated if desired.

The stripped rubber-in-monomer solutions can be used in preparing rubber-modified styrene-type polymers either substantially immediately after the distillation step or after being stored for awhile, since the solutions can be stored as easily as styrene-type monomers without making them less suitable for use in this application. As will be readily understood, a polymerization inhibitor should be incorporated to prevent premature polymerization of the monovinylidene aromatic hydrocarbon when the rubber-in-monomer solutions are to be stored prior to use, and stabilizers such as antioxidants can also be incorporated if desired.

In accordance with the present invention, a rubber-modified styrene-type polymer is prepared by heating a polymerizable material comprising a rubber-in-monomer solution of the invention in order to polymerize the monovinylidene aromatic hydrocarbon. In addition to the rubber-in-monomer solution, the polymerizable material can comprise one or more copolymerizable materials, such as an unreacted diene remaining in the solution after the stripping of the rubber-in-monomer solution or ingredients intimately mixed with the rubber-in-monomer solution after the distillation step, e.g., an additional rubbery conjugated 1,3-diene polymer, such as natural rubber, polybutadiene, polyisoprene, copolymers of butadiene and/or isoprene with one or more comonomers such as styrene, alpha-methylstyrene, (meth)acrylic acid, (meth)acrylonitrile, methyl (meth)acrylate, higher alkyl (meth)acrylates, etc., preferably a substantially linear diene rubber consisting principally of 1,4-diene units; one or more additional monovinylidene aromatic hydrocarbons; an ar-halo monovinylidene aromatic hydrocarbon, such as the o-, m-, and p-chlorostyrenes, p-bromostyrene, 2,4-dichlorostyrene, 2-chloro-4-methylstyrene, etc.; a conjugated 1,3-diene, such as butadiene, isoprene, etc.; an acrylic compound, such as (meth)acrylic acid, (meth)acrylonitrile, (meth)acrylamide, methyl (meth)acrylate, 2-ethylhexyl (meth)acrylate, and other alkyl (meth)acrylates, etc. Ordinarily, the components of the polymerizable material are combined in such proportions that the polymerizable material has a polymerized conjugated 1,3-diene content of about 1–25%, preferably about 4–15% by weight, and a monovinylidene aromatic hydrocarbon constitutes at least about 50% by weight of the monomeric ingredients.

Preparation of a rubber-modified styrene-type polymer in accordance with the present invention can be accomplished by any of the techniques conventionally employed in preparing such materials by polymerizing a styrene-type monomer containing a dissolved rubber, with the exception that a rubber-in-monomer solution of the invention is an essential ingredient of the polymerizable material and is preferably the only ingredient comprising a polymerized conjugated 1,3-diene. Thus, the polymerization can be conducted by mass, suspension, or mass-suspension techniques, usually with agitation at temperatures in the range of about 50–175° C., until the desired conversion of monomer to polymer is obtained. When desired, materials such as free radical polymerization initiators, stabilizers, plasticizers, polymerization modifiers, colorants, etc., are included in the reaction mixture, polymerization modifiers being particularly desirable in the all-mass processes because of the heat-transfer problems associated with mass polymerization.

When a suspension technique is employed, water, a suspending agent, and any other adjuvants desired for the suspension process are also included in the reaction mixture. Preferred suspending agents are water-soluble acrylic acid/alkyl (meth)acrylate copolymers of the type described in U.S. Patent 3,051,682, a particularly suitable suspending agent being a water-soluble copolymer of 95–98 mol percent of acrylic acid and 5–2 mol percent of 2-ethylhexyl acrylate.

When a mass-suspension technique is employed, polymerization is usually conducted by a mass process until phase inversion has occurred (i.e., until sufficient resinous polymer has been formed for the adjustment in the relative amounts of resinous and rubbery polymer to force the diene rubber to become the discontinuous rather than the continuous phase of the resinous polymer-diene rubber dispersion, resulting in an abrupt decrease in the viscosity of the reaction mixture), and the adjuvants for the suspension process are usually incorporated within about 5–10% additional conversion of monomer to polymer after phase inversion has occurred.

After the polymerizable materials have been heated to obtain the desired degree of polymerization, any unreacted monomer can be removed by conventional devolatilization techniques. The product can be used per se or can be diluted to a lower rubber content by blending it with a resinous styrene-type polymer.

The invention is particularly advantageous in that it provides convenient, economical processes for preparing rubber-modified styrene-type polymers and rubber-in-monomer solutions for use in preparing rubber-modified styrene-type polymers and has the additional advantage that the rubber-in-monomer solutions can be easily stored without causing deterioration of the rubbery polymers. The rubbery polymers obtained by the practice of the invention have the desirable characteristic of having their combined diene content composed principally of 1,4-diene units.

It is obvious that many variations can be made in the products and processes set forth above without departing from the spirit and scope of this invention.

What is claimed is:

1. A process which comprises the steps of contacting a conjugated 1,3-diene hydrocarbon with a lithium catalyst of the group consisting of lithium and a hydrocarbyl lithium in the presence of a diluent having a boiling point lower than 130° C. and selected from the group consisting of a conjugated 1,3-diene hydrocarbon, an alkane, a cycloalkane, an aromatic hydrocarbon, and mixtures thereof, maintaining the conjugated 1,3-diene hydrocarbon in contact with the lithium catalyst at least until a rubbery polymer is formed, adding at least 3 parts by weight of a monovinylidene aromatic hydrocarbon/part of rubbery polymer, deactivating the rubbery polymer to terminate the catalytic activity of the lithium catalyst at a stage after a rubbery polymer has been formed and before sufficient monovinylidene aromatic hydrocarbon has block copolymerized with the rubbery polymer to form a polymer containing more than 75% by weight of combined monovinylidene aromatic hydrocarbon, stripping the reaction mixture of ingredients having lower boiling points than the monovinylidene aromatic hydrocarbon by distillation to produce a rubber in monomer solution providing a polymerizable material, adding an organoperoxy catalyst to the polymerizable material and heating said polymerizable material in the presence of said organoperoxy catalyst to produce polymerization of the monovinylidene aromatic hydrocarbon and grafting of at least a portion thereof upon said rubbery polymer.

2. The process of claim 1 wherein the polymerizable material is mass polymerized until phase inversion of the reaction mixture has occurred and is subsequently polymerized in aqueous suspension.

3. The process of claim 1 wherein the polymerizable material has a polymerized conjugated 1,3-diene content of about 4–15% by weight.

4. The process of claim 1 wherein the polymerizable material comprises a mixture of the rubber-in-monomer solution and a copolymerizable monomer.

5. The process of claim 4 wherein the copolymerizable monomer is a monovinylidene aromatic hydrocarbon.

6. The process of claim 4 wherein the copolymerizable monomer is an acrylic compound.

7. The process of claim 1 wherein the polymerizable material comprises an intimate mixture of the rubber-in-monomer solution and an additional rubbery conjugated 1,3-diene polymer.

8. The process of claim 1 wherein the conjugated 1,3-diene hydrocarbon employed in preparing the rubber-in-monomer solution is butadiene.

9. The process of claim 1 wherein the monovinylidene aromatic hydrocarbon employed in preparing the rubber-in-monomer solution is styrene.

10. The process of claim 1 wherein the monovinylidene aromatic hydrocarbon employed in preparing the rubber-in-monomer solution is a mixture of styrene and alpha-methylstyrene.

11. The process of claim 1 wherein the lithium catalyst employed in preparing the rubber-in-monomer solution is a hydrocarbyl lithium.

12. The process of claim 11 wherein the hydrocarbyl lithium is an alkyl lithium.

13. A process which comprises (1) preparing a rubber-in-monomer solution by contacting a conjugated 1,3-diene hydrocarbon with a lithium catalyst of the group consisting of lithium and a hydrocarbyl lithium in the presence of a diluent having a boiling point lower than 130° C. and selected from the group consisting of a conjugated 1,3-diene hydrocarbon, an alkane, a cycloalkane, an aromatic hydrocarbon, and mixtures thereof, maintaining the conjugated 1,3-diene hydrocarbon in contact with the lithium catalyst at least until a rubbery polymer is formed, adding at least 3 parts by weight of a monovinylidene aromatic hydrocarbon/part of rubbery polymer, deactivating the rubbery polymer to terminate the catalytic activity of the lithium catalyst at a stage after a rubbery polymer has been formed and before sufficient monovinylidene aromatic hydrocarbon has block copolymerized with the rubbery polymer to form a polymer containing more than 75% by weight of combined monovinylidene aromatic hydrocarbon and stripping the reaction mixture of ingredients having lower boiling points than the monovinylidene aromatic hydrocarbon by distillation and (2) adding to the rubber in monomer solution an organoperoxy catalyst and heating the resultant rubber-in-monomer solution in the presence of said organoperoxy catalyst to polymerize the monovinylidene aromatic hydrocarbon and to graft at least a portion of said monovinylidene aromatic hydrocarbon upon said rubbery polymer.

14. A process which comprises (1) preparing a polybutadiene-in-styrene solution by contacting butadiene with an alkyl lithium catalyst, maintaining it in contact with the alkyl lithium until a solution of not more than 25% by weight of rubbery polybutadiene in butadiene is formed, reactivating the rubbery polybutadiene, adding at least 3 parts by weight of styrene/part of rubbery butadiene, deactivating the rubbery polymer to terminate the catalytic activity of the lithium catalyst, and stripping the reaction mixture of unreacted butadiene by distillation and (2) adding an organoperoxy catalyst to said polybutadiene-in-styrene solution and heating the resultant polybutadiene-in-styrene solution in the presence of said organoperoxy catalyst to polymerize the styrene and to graft at least a portion of the styrene onto said polybutadiene.

15. A process which comprises (1) preparing a rubber-in-monomer solution by contacting a conjugated 1,3-diene hydrocarbon with a lithium catalyst of the group consisting of lithium and a hydrocarbyl lithium in the presence of a diluent having a boiling point lower than 130° C. and selected from the group consisting of a conjugated 1,3-diene hydrocarbon, an alkane, a cycloalkane, an aromatic hydrocarbon, and mixtures thereof, maintaining the conjugated 1,3-diene hydrocarbon in contact with the lithium catalyst at least until a rubbery polymer is formed, adding at least 3 parts by weight of a monovinylidene aromatic hydrocarbon/part of rubbery polymer, deactivating the rubbery polymer to terminate the catalytic activity of the lithium catalyst at a stage after a rubbery polymer has been formed and before sufficient monovinylidene aromatic hydrocarbon has block copolymerized with the rubbery polymer to form a polymer containing more than 75% by weight of combined monovinylidene aromatic hydrocarbon, stripping the reaction mixture of ingredients having lower boiling points than the monovinylidene aromatic hydrocarbon by distillation to produce a rubber-in-monomer solution providing a polymerizable material, and (2) adding an organoperoxy catalyst to the polymerizable material and heating said polymerizable material in the presence of said organoperoxy catalyst to produce polymerization of the monovinylidene aromatic hydrocarbon and grafting of at least a portion thereof upon said rubbery polymer.

16. The process of claim 15 wherein the reaction mixture is deactivated prior to the addition of the monovinylidene aromatic hydrocarbon.

17. The process of claim 15 wherein the reaction mixture is deactivated after sufficient monovinylidene aromatic hydrocarbon has block copolymerized with the rubbery polymer for a polymer containing 5–75% by weight of combined monovinylidene aromatic hydrocarbon to be obtained.

References Cited by the Examiner

UNITED STATES PATENTS

| | | | |
|---|---|---|---|
| 2,149,182 | 9/1964 | Porter | 260—880 |
| 2,755,270 | 7/1965 | Hayes | 260—880 |

FOREIGN PATENTS

| | | |
|---|---|---|
| 238,542 | 6/1959 | Australia. |
| 767,642 | 2/1957 | Great Britain. |
| 884,974 | 12/1961 | Great Britain. |

MURRAY TILLMAN, *Primary Examiner.*

PAUL LIEBERMAN, *Assistant Examiner.*